(12) United States Patent
Chang

(10) Patent No.: US 9,438,707 B2
(45) Date of Patent: Sep. 6, 2016

(54) ELECTRONIC DEVICE HAVING FLEXIBLE SEALING MEMBER

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 72 days.

(21) Appl. No.: 14/525,457

(22) Filed: Oct. 28, 2014

(65) Prior Publication Data

US 2015/0181737 A1 Jun. 25, 2015

(30) Foreign Application Priority Data

Dec. 25, 2013 (CN) .......................... 2013 1 0722422

(51) Int. Cl.
*H04M 1/02* (2006.01)
*H04M 1/18* (2006.01)
(52) U.S. Cl.
CPC ......... *H04M 1/0252* (2013.01); *H04M 1/0249* (2013.01); *H04M 1/18* (2013.01)
(58) Field of Classification Search
CPC .. H04M 1/0249; H04M 1/0252; H04M 1/18; H04B 2001/3894; H05K 5/061; F16J 15/3288
See application file for complete search history.

(56) References Cited

U.S. PATENT DOCUMENTS

| | | | |
|---|---|---|---|
| 7,298,584 B1 | 11/2007 | Yamada et al. | |
| 8,929,058 B2* | 1/2015 | Pan | H04M 1/026 312/293.3 |
| 2008/0182633 A1* | 7/2008 | Imaizumi | H04M 1/0249 455/575.1 |
| 2009/0059502 A1* | 3/2009 | Filson | G06F 1/1601 361/679.27 |
| 2012/0043331 A1* | 2/2012 | Nameki | F16J 15/062 220/378 |
| 2012/0074153 A1* | 3/2012 | Yang | H04M 1/18 220/694 |
| 2013/0003267 A1* | 1/2013 | Pan | H04M 1/026 361/679.01 |
| 2014/0084762 A1* | 3/2014 | Lai | H05K 5/0221 312/223.1 |
| 2015/0005042 A1* | 1/2015 | Lee | H04M 1/18 455/572 |
| 2015/0350393 A1* | 12/2015 | Midori | H04M 1/18 455/575.8 |

FOREIGN PATENT DOCUMENTS

TW 200942126 A 10/2009

\* cited by examiner

*Primary Examiner* — Hoa C Nguyen
*Assistant Examiner* — Keith DePew
(74) *Attorney, Agent, or Firm* — Zhigang Ma

(57) ABSTRACT

An electronic device includes a first housing, an second housing coupled to the first housing, and a flexible sealing member mounted on the second housing. The first housing defines a receiving groove substantially in a shape of a loop. The flexible sealing member includes a fixing portion, a first sealing portion protruding from the fixing portion and substantially in a shape of a ring, and a second sealing portion protruding from the fixing portion and substantially in a shape of a ring. The second sealing portion is surrounded by the first sealing portion. The first sealing portion and the second sealing portion are deformed and received in the receiving groove. The first sealing portion resists the second sealing portion. The first sealing portion and the second sealing portion both resist the first housing.

20 Claims, 7 Drawing Sheets

ELECTRONIC DEVICE HAVING FLEXIBLE SEALING MEMBER

FIELD

The subject matter herein generally relates to electronic devices, and particularly to a waterproof electronic device.

BACKGROUND

When an electronic device needs to be waterproof, a sealing ring can be used. When assembling the electronic device, the sealing ring is put on a lower housing and then an upper housing is covered on the sealing ring. Thus, the sealing ring is sandwiched between the lower housing and the upper housing.

BRIEF DESCRIPTION OF THE DRAWINGS

Implementations of the present technology will now be described, by way of example only, with reference to the attached figures.

DETAILED DESCRIPTION

Figure 1:
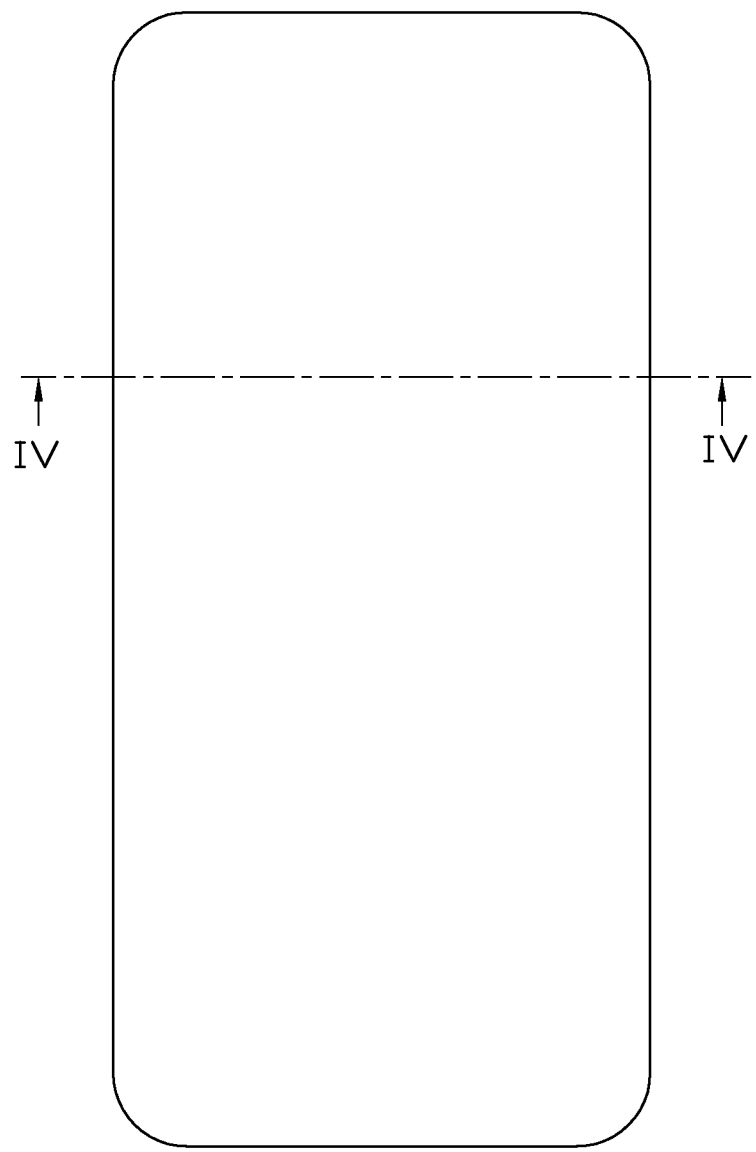
FIG. 1 is a top view of an embodiment of an electronic device including a first housing and a second housing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to an electronic device which can include a first housing, a second housing coupled to the first housing, and a flexible sealing member mounted on the second housing. The first housing can define a receiving groove substantially in a shape of a loop. The flexible sealing member can include a fixing portion, a first sealing portion, and a sealing portion. The first sealing portion and the second sealing portion both can protrude from the fixing portion and substantially in a shape of a ring. The second sealing portion can be surrounded by the first sealing portion. The first sealing portion and the second sealing portion can be deformed and received in the receiving groove. The first sealing portion can resist the second sealing portion. The first sealing portion and the second sealing portion both can resist the first housing.

Figure 2:
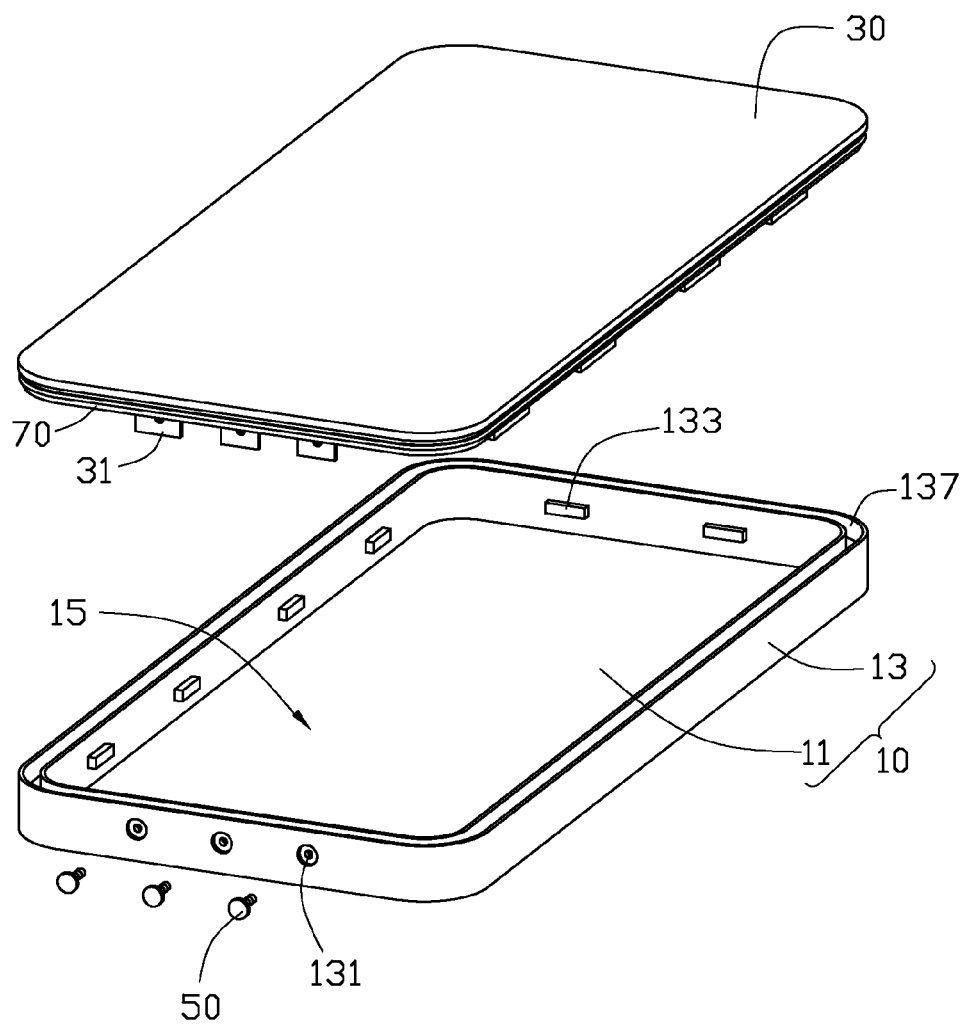
FIG. 2 is an exploded, isometric view of the electronic device of FIG. 1.

FIG. 1 illustrates an embodiment of an electronic device 100 which shown in a top view. FIG. 2 illustrates that the electronic device 100 can include a first housing 10, a second housing 30 coupled to the first housing 10, a plurality of fasteners 50, and a flexible sealing member 70 mounted on the second housing 30. The plurality of fasteners 50 can be configured to fix the first housing 10 with the second housing 30. The first housing 10 can be latched to the second housing 30. The flexible sealing member 70 can be received in the first housing 10. In the illustrated embodiment, the electronic device 100 can be a mobile phone.

The first housing 10 can be substantially rectangular in shape. The first housing 10 can include a bottom wall 11 and four sidewalls 13 substantially extending from edges of the bottom wall 11. The four sidewalls 13 can be substantially perpendicular to the bottom wall 11. The bottom wall 11 and the four sidewalls 13 can define a receiving chamber 15, cooperatively. The receiving chamber 15 can be configured to receive other elements of the electronic device, such as circuit board (not shown in the FIGS.). One of the four sidewalls 13 can define three through holes 131 and the other three sidewalls 13 can be coupled to a plurality of first latching members 133. The first latching members 133 can be arranged apart at inner side surfaces of the sidewalls 13. In the illustrated embodiment, the first latching members 133 are protrusions.

Figure 5:
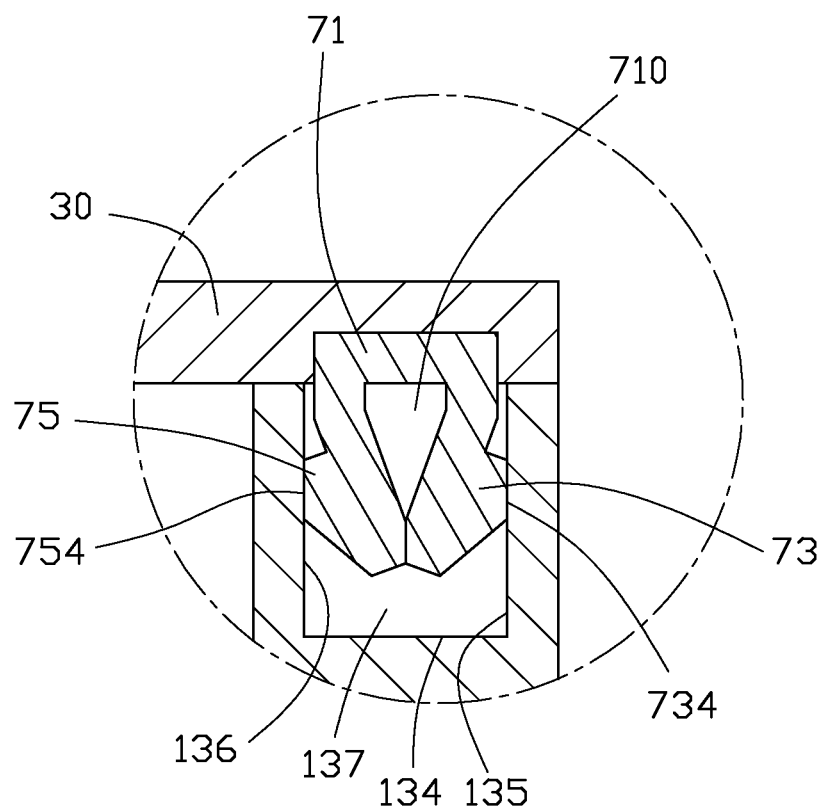
FIG. 5 is an enlarged view of the circle V of FIG. 4, which the electronic device in an assembled state.

The four sidewalls 13 can recess to a bottom surface 134 (shown in FIG. 5) to define a receiving groove 137. The receiving groove 137 can be defined at top of the sidewalls 13. FIG. 5 illustrates that a first side surface 135 and a second side surface 136 facing the first side surface 135 can be received in the receiving groove 137. The first side surface 135, the second side surface 136, and the bottom surface 134 can define the receiving groove 137, cooperatively. The first side surface 135 can be parallel to the second side surface 136. The bottom surface 134 can be coupled to the first side surface 135 and the second side surface 136. In the illustrated embodiment, the receiving groove 137 can be substantially in a shape of a rectangular loop. Thus, the side first side surface 135, the second side surface 136, and the bottom surface 134 both can be in a shape of a ring. The second side surface 136 can be enclosed by the first side surface 135.

Figure 3:
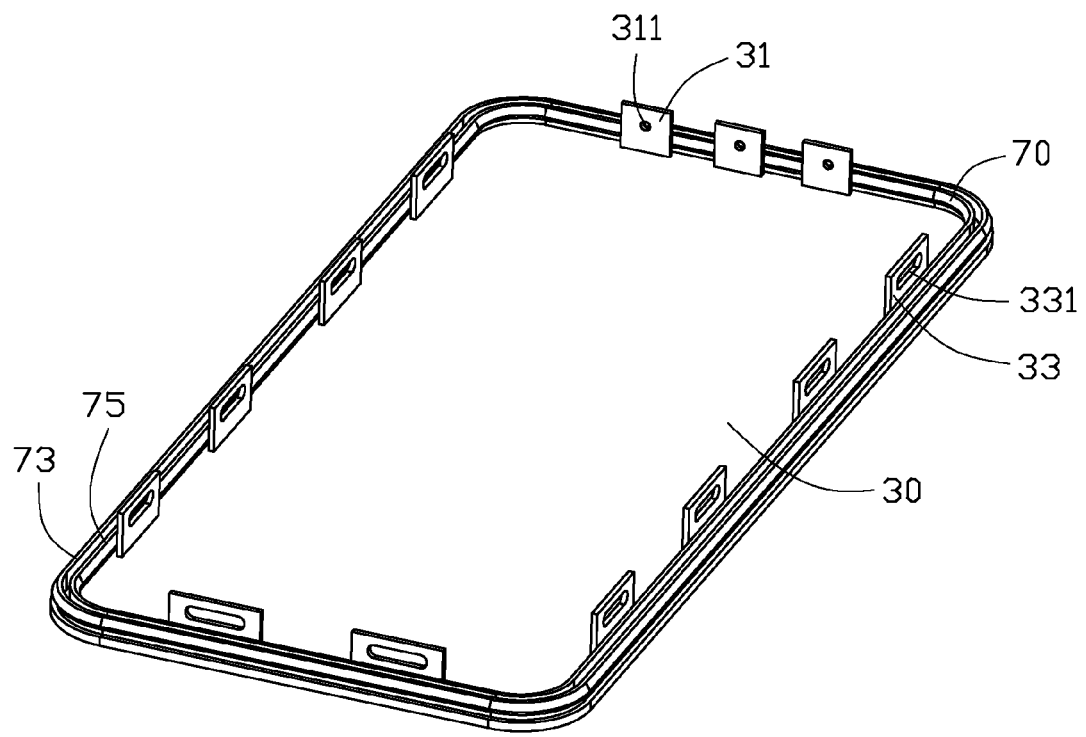
FIG. 3 is an isometric view of the second housing of the electronic device of FIG. 2.

FIG. 3 illustrates that the second housing 30 can be substantially in a shape of rectangular plate. Three locking members 31 can be coupled to the second housing 30 and corresponding to the three through holes 131. The three locking members 31 can be adjacent to a sidewall of the second housing 30. Each locking member 31 can define a through hole 311. A plurality of second latching members 33 can be coupled to the second housing 30 and corresponding to the first latching members 133. The second latching members 33 can be adjacent to other three sidewalls of the second housing 30. Each second latching member 33 can define a latching hole 331. The second latching members 33 of the second housing 30 can be latched to the first latching members 133 of the first housing 10. Each first latching member 133 can pass through the latching hole 331 of the corresponding second latching member 33. The locking members 31 of the second housing 30 can be received in the receiving chamber 15. Each through hole 311 of the locking member 31 can be aligned with the corresponding through hole 131 of the sidewall 13. Each fastener 50 can pass through the corresponding through hole 131 of the sidewall 13 and the corresponding through hole 311 of the locking member 31, to fix the second housing 30 with the first housing 10. In the illustrated embodiment, the first housing 10 is a lower housing of the electronic device 100. The second housing 30 is an upper housing of the electronic device 100.

Figure 4:
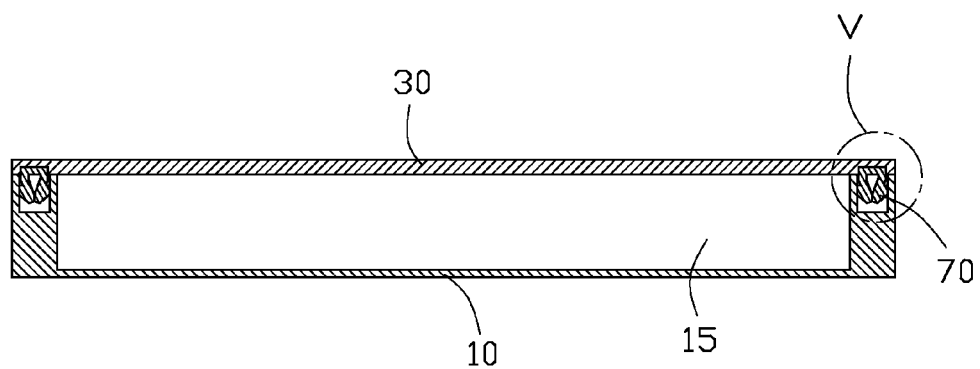
FIG. 4 is a cross sectional view of the electronic device of FIG. 1, taken along line IV-IV.

FIG. 4 illustrates that the flexible sealing member 70 can be made of flexible materials. The flexible member 70 can be mounted on the second housing 30 via either insert molding, gluing, or fastening. The flexible member 70 can be positioned at a surface of the second housing 30 facing to the first housing 10. The flexible sealing member 70 can be in a shape of a ring and accommodate with the receiving groove 137.

FIG. 5 illustrates that the flexible sealing member 70 can include a fixing portion 71 coupled to the second housing 30, a first sealing portion 73, and a second sealing portion 75. The first sealing portion 73 and the second sealing portion 75 both can protrude from the fixing portion 71. The fixing portion 71 can be an enclosed ring-shaped protrusion and a sectional view of the fixing portion 71 can be substantially U-shaped. The first sealing portion 73 can protrude from an outer side surface 701 of the fixing portion 71. The second sealing portion 75 can protrude from an inner side surface 702 of the fixing portion 71. The first sealing portion 73 can be spaced from the second sealing portion 75. The first sealing portion 73 and the second sealing portion 75 can be symmetrically positioned at opposite sides of the fixing portion 71. A structure of the first sealing portion 73 can be similar to that of the second sealing portion 75. The first sealing portion 73 and the second sealing portion 75 both can be in a shape of a ring. The first sealing portion 73 can surround the second sealing portion 75.

The fixing portion 71 can define a deformable groove 710 substantially in a ring shape. The deformable groove 710 can have an opening 703. The fixing portion 71 can include two first coupling surfaces 711 parallel to each other and two first inclined surfaces 713 coupled to the corresponding first coupling surface 711. The first coupling surfaces 711 can face each other. The inclined surfaces 713 can be positioned adjacent to the opening 703. The first coupling surfaces 711 and the inclined surfaces 713 can be received in the deformable groove 710.

The first sealing portion 73 can protrude substantially perpendicular from the outer side surface 701 of the fixing portion 71. The first sealing portion 73 can include a second coupling surface 732, a second inclined surface 734, and a first inclined guiding surface 735 coupling in that order. The second coupling surface 732 and the first inclined guiding surface 735 both can be coupled to the fixing portion 71. The first inclined guiding surface 735 can be positioned adjacent to the opening 703 and at a side of the first sealing portion 73 away from the second sealing portion 75. The second inclined surface 734 can be parallel to the corresponding first inclined surface 713. A minimum distance between the first inclined surface 713 and the second inclined surface 734 can be substantially equal to a half of a width of the receiving groove 137.

The second sealing portion 75 can protrude substantially perpendicular from the inner side surface 702 of the fixing portion 71. The second sealing portion 75 can also include a second coupling surface 752, a second inclined surface 754, and a second inclined guiding surface 755 coupling in that order. The second coupling surface 752 and the second inclined guiding surface 755 both can be coupled to the fixing portion 71. The second inclined guiding surface 755 can be positioned adjacent to the opening 703 and at a side of the second sealing portion 75 away from the first sealing portion 73. The second inclined surface 754 can be parallel to the corresponding first inclined surface 713. A minimum distance between the first inclined surface 713 and the second inclined surface 754 can substantially be equal to a half of the width of the receiving groove 137.

When the flexible sealing member 70 is disassembled with the first housing 10, a minimum distance between the first inclined guiding surface 735 and the second inclined guiding surface 755 can be less than the width of the receiving groove 137. A maximum distance between the first inclined guiding surface 735 and the second inclined guiding surface 755 can be larger than the width of the receiving groove 137. The first sealing portion 73 and the second sealing portion 75 can be received in the receiving groove 137. One of the first inclined surfaces 713 can resist the other one of the first inclined surfaces 713. The second inclined surface 734 can resist the first side surface 135. The second inclined surface 754 can resist the second side surface 136.

Figure 6:
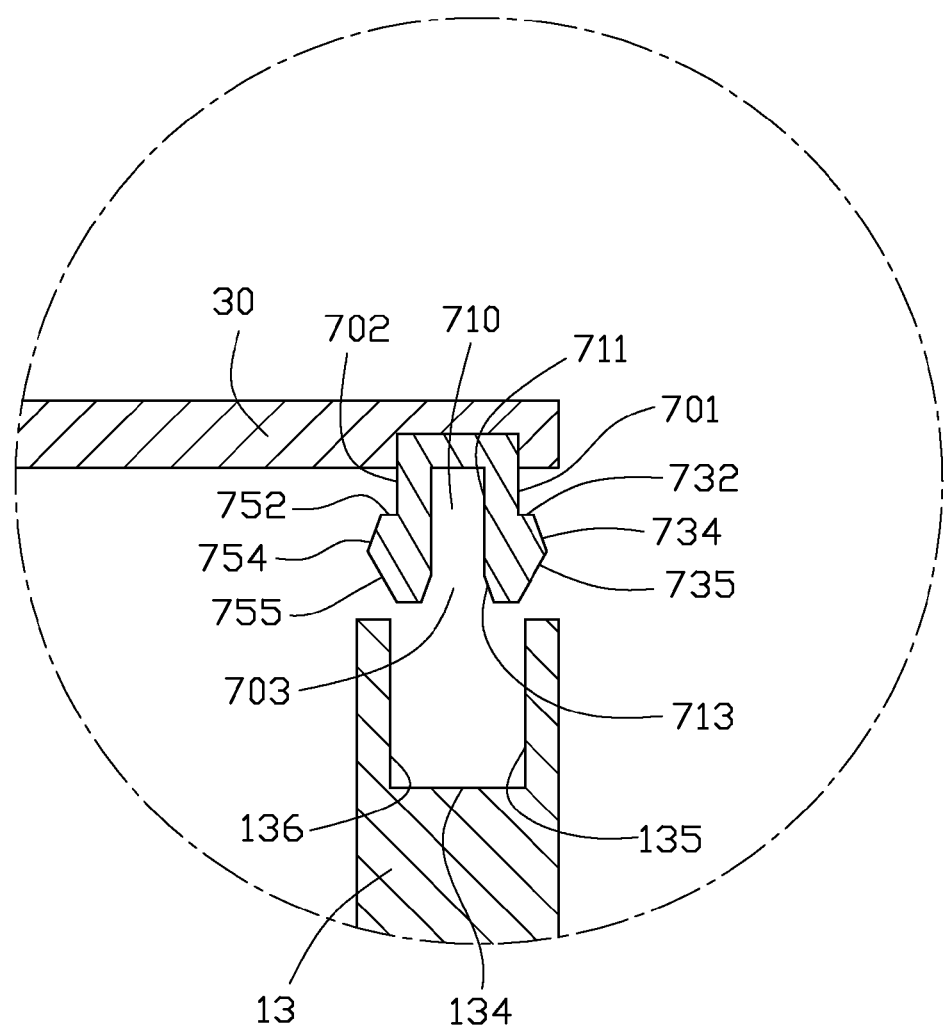
FIG. 6 is an enlarged view of the circle V of FIG. 4, which the electronic device in a first assembling state.
Figure 7:
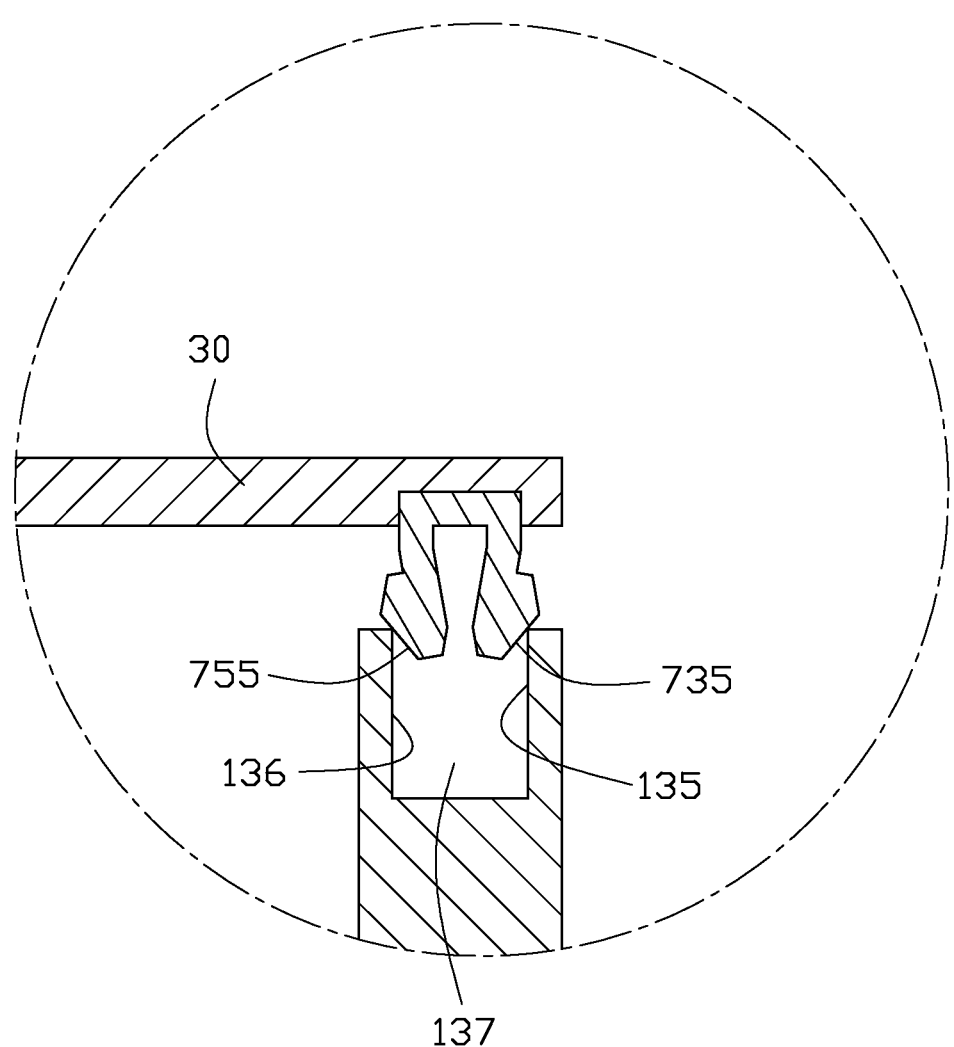
FIG. 7 is an enlarged view of the circle V of FIG. 4, which the electronic device in a second assembling state.

In assembly, the locking members 31 of the second housing 30 and the second latching members 33 can face the receiving chamber 15 of the first housing 10. The second housing 30 can move towards the first housing 10 until the locking members 31 and the second latching members 33 are received in the receiving chamber 15. FIG. 6 illustrates that the flexible sealing member 70 can be aligned to the receiving groove 137. Then, the electronic device 100 is in a first assembling state. FIG. 7 illustrates that the first inclined guiding surface 735 of the first sealing portion 73 can resist an upper edge of the first side surface 135. The second inclined guiding surface 755 of the second sealing portion 75 can resist an upper edge of the second side surface 136. Then, the electronic device 100 is in a second assembling state.

When the second housing 30 keeps moving towards the first housing 10, the first sealing portion 73 and the second sealing portion 75 can be deformed and move towards each other. The first sealing portion 73 and the second sealing portion 75 can slide into the receiving groove 137 guided by the first inclined guiding surface 735 and the second inclined guiding surface 755. When the first sealing portion 73 and the second sealing portion 75 received in the receiving groove 137, one of the first inclined surfaces 713 can resist the other one of the first inclined surfaces 713. The second inclined surface 734 can resist the first side surface 135. The second inclined surface 754 can resist the second side surface 136.

The first latching members 133 can pass through the corresponding latching hole 311, such that the first latching members 133 can be latched to the second latching members 33. The fasteners 50 can pass through the through holes 311 of the locking members 31 and the through holes 131 of the sidewalls 13, such that the second housing 30 can be fixed to the first housing 10.

In at least embodiment, the first sealing portion 73 and second sealing portion 75 can be coupled to the second housing 30. Then, the fixing portion 71 can be omitted.

The embodiments shown and described above are only examples. Many details are often found in the art such as the other features of a electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
a first housing defining a receiving groove substantially in a shape of a loop;
a second housing coupled to the first housing; and
a flexible sealing member mounted on the second housing and comprising:
a fixing portion,
a first sealing portion protruding from the fixing portion and substantially in a shape of a ring, and
a second sealing portion protruding from the fixing portion and substantially in a shape of a ring, the second sealing portion surrounded by the first sealing portion,
wherein, the first sealing portion and the second sealing portion are deformed and received in the receiving groove, the first sealing portion resists the second sealing portion, the first sealing portion and the second sealing portion both resist the first housing; and
wherein the first sealing portion comprises a first inclined guiding surface located at a side of the first sealing portion away from the second sealing portion, the second sealing portion comprises a second inclined guiding surface located at a side of the second sealing portion away from the first sealing portion, and a maximum distance between the first inclined guiding surface and the second inclined guiding surface is larger than the width of the receiving groove when the flexible sealing member is disassembled with the first housing.

2. The electronic device of claim 1, wherein the first sealing portion and the second inclined guiding surface are received in the receiving groove and resist the first housing.

3. The electronic device of claim 2, wherein when the flexible sealing member is disassembled with the first housing, a minimum distance between the first inclined guiding surface and the second inclined guiding surface is less than a width of the receiving groove.

4. The electronic device of claim 1, wherein the fixing portion comprises two first inclined surfaces facing each other, both the first sealing portion and the second sealing portion comprise a second inclined surface parallel to the corresponding first inclined surfaces, one of the first inclined surfaces resists the other one of the first inclined surfaces, both of the second inclined surfaces resist the first housing.

5. The electronic device of claim 4, wherein the second inclined surface of the first sealing member is coupled to the first inclined guiding surface, the second inclined surface of the second sealing member is coupled to the second inclined guiding surface.

6. The electronic device of claim 4, wherein the first housing comprises a bottom wall and four sidewalls substantially extending from edges of the bottom wall, the receiving groove is defined at top of the sidewalls.

7. The electronic device of claim 6, wherein the sidewalls recess to a bottom surface to define the receiving groove, a first side surface and a second side surface parallel to the first side surface are received in the receiving groove, the first side surface, the second side surface, and the bottom surface define the receiving groove, cooperatively, the second inclined surface of the first sealing portion resists the first side surface, the second inclined surface of the second sealing portion resists the second side surface.

8. The electronic device of claim 1, wherein the fixing portion is an enclosed ring-shaped protrusion and a sectional view of the fixing portion is substantially U-shaped, the first sealing portion protrudes from an outer side surface of the fixing portion, the second sealing portion protrudes from an inner side surface of the fixing portion.

9. The electronic device of claim 1, wherein a plurality of first latching members are coupled to the first housing, a plurality of second latching members are coupled to the second housing, the plurality of first latching members are latched to the plurality of second latching members.

10. The electronic device of claim 1, wherein the first housing defines at least one through hole, at least one locking member is coupled to the second housing, at least one fastener passes the at least one through hole and the at least one locking member to lock the at least one locking member with the first housing.

11. An electronic device comprising:
a first housing defining a receiving groove;
a second housing coupled to the first housing;
a flexible sealing member mounted on the second housing and comprising:
a first sealing portion coupled to the second housing, and
a second sealing portion coupled to the second housing, the second sealing portion surrounded by the first sealing portion
wherein, the first sealing portion and the second sealing portion are deformed and received in the receiving groove, the first sealing portion resists the second sealing portion, the first sealing portion and the second sealing portion both resist the first housing; and
wherein the first sealing portion comprises a first inclined guiding surface located at a side of the first sealing portion away from the second sealing portion, the second sealing portion comprises a second inclined guiding surface located at a side of the second sealing portion away from the first sealing portion, and a maximum distance between the first inclined guiding surface and the second inclined guiding surface is larger than the width of the receiving groove when the flexible sealing member is disassembled with the first housing.

12. The electronic device of claim 11, wherein the first sealing portion and the second inclined guiding surface are received in the receiving groove and resist the first housing.

13. The electronic device of claim 12, wherein when the flexible sealing member is disassembled with the first housing, a minimum distance between the first inclined guiding surface and the second inclined guiding surface is less than a width of the receiving groove.

14. The electronic device of claim 11, wherein the flexible sealing member further comprises a fixing portion coupled to the first sealing portion and the second sealing portion, the fixing portion comprises two first inclined surfaces facing each other, both the first sealing portion and the second sealing portion comprise a second inclined surface parallel to the corresponding first inclined surfaces, one of the first inclined surfaces resists the other one of the first inclined surfaces, both of the second inclined surfaces resist the first housing.

15. The electronic device of claim 14, wherein the second inclined surface of the first sealing member is coupled to the first inclined guiding surface, the second inclined surface of the second sealing member is coupled to the second inclined guiding surface.

16. The electronic device of claim 15, wherein the fixing portion is an enclosed ring-shaped protrusion and a sectional view of the fixing portion is substantially U-shaped, the first sealing portion protrudes from an outer side surface of the fixing portion, the second sealing portion protrudes from an inner side surface of the fixing portion.

17. The electronic device of claim 14, wherein the first housing comprises a bottom wall and four sidewalls substantially extending from edges of the bottom wall, the receiving groove is defined at top of the sidewalls.

18. The electronic device of claim 17, wherein the sidewalls recess to a bottom surface to define the receiving groove, a first side surface and a second side surface parallel to the first side surface are received in the receiving groove, the first side surface, the second side surface, and the bottom surface define the receiving groove, cooperatively, the second inclined surface of the first sealing portion resists the first side surface, the second inclined surface of the second sealing portion resists the second side surface.

19. The electronic device of claim 11, wherein a plurality of first latching members are coupled to the first housing, a plurality of second latching members are coupled to the second housing, the plurality of first latching members are latched to the plurality of second latching members.

20. The electronic device of claim 11, wherein the first housing is fixed to the second housing via a plurality of fasteners.

\* \* \* \* \*